United States Patent [19]

Perry et al.

[11] Patent Number: 5,289,281
[45] Date of Patent: Feb. 22, 1994

[54] HIGH DEFINITION VIDEO FRAME RECORDER

[75] Inventors: Vinson R. Perry, San Carlos; Marc Klingelhofer, Fremont; Thomas A. Rohwer, Sunnyvale, all of Calif.

[73] Assignee: Sony Corporation, Tokyo, Japan

[21] Appl. No.: 880,304

[22] Filed: May 5, 1992

Related U.S. Application Data

[63] Continuation of Ser. No. 424,478, Oct. 20, 1989, abandoned.

[51] Int. Cl.$^5$ ............................................. H04N 5/14
[52] U.S. Cl. .................................................. 348/521
[58] Field of Search ............................. 358/160, 21 R

[56] References Cited

U.S. PATENT DOCUMENTS 4,539,593  9/1985  Jutier et al. ........................ 358/160

FOREIGN PATENT DOCUMENTS 0176290  4/1986  European Pat. Off. .
0031282  2/1988  Japan .
WO88/05244  7/1988  PCT Int'l Appl. .

OTHER PUBLICATIONS

Boxes, Gregory A "Digital Image Processing", Prentice-Hall Inc., 1984, pp. 23-26 & 69-76.
Crook et al., *Solid State Video Recorder*, International Broadcasting Convention, Brighton, GB, (9-88) pp. 422-424.
Descamps, *Un ASIC, Controleur Specialise de Video RAM*, Toute L'Electronique, No. 544, Paris, FR (5-89), pp. 28-32.
Nakaya, et al., *An HDTV Image Processing Simulator and its Applications to Bit Rate Reduction*, Proceedings of the Second International Workshop on Signal Processing of HDTV, L'Aquila, IT (Feb. 29, 1988-Mar. 2, 1988), pp. 309-316.
Riley, et al., *A Review of the Semiconductor Storage of Television Signals*, BBC Research Department Report, No. 6, Tadworth, GB., (Aug. 1987) pp. 1-29.
Woodham, *A Solid State "Action Replay" Recorder*, 16th International TV Symposium; Symposium Record Broadcast Sessions, Montreaux, CH (6-89) pp. 289-295.
Perry, *HDTV Digital Frame Recorder*, Journal of the Society of Motion Picture Engineers, vol. 100, No. 1, New York, NY, (Jan. 1991), pp. 10-13.
Prexl, *ASIC Steuert Digitalen Halbbiidspeicher*, Electronik, vol. 38, No. 7, Munchen, DE (Mar. 1989), pp. 71-74.
Rebo Research, Inc. brochure entitled "ReStore", (1989), 4 pages.

*Primary Examiner*—James J. Groody
*Assistant Examiner*—David E. Harvey

[57] ABSTRACT

A system for recording one or more individual fields or frames of a color, high definition video signal. In a preferred embodiment, the system is capable of digitally recording as many as 32 frames of a color, high definition video signal per memory board, and as many as four memory boards may be installed in the system. The invention is capable of performing partial or full frame (or field) transfers at any selected rate less than or equal to the standard video rate. In a preferred embodiment, the system of the invention accepts HDTV signals in either digital or analog format, includes a post processing unit for simultaneously reconstructing stored HDTV signals in both digital and analog format, and a control unit which emulates a conventional video tape recorder (in the sense that it responds to conventional video tape recorder control signals) for controlling the system's frame memory. The invention includes a parallel computer interface which permits transfer of full or partial fields or frames (in non-real time) between the frame memory and an external computer (or image processing unit) via a conventional communication link. The control unit and an interface unit including the parallel computer interface are connected by a serial communications link, so that a host computer may control memory access through the interface unit.

10 Claims, 8 Drawing Sheets

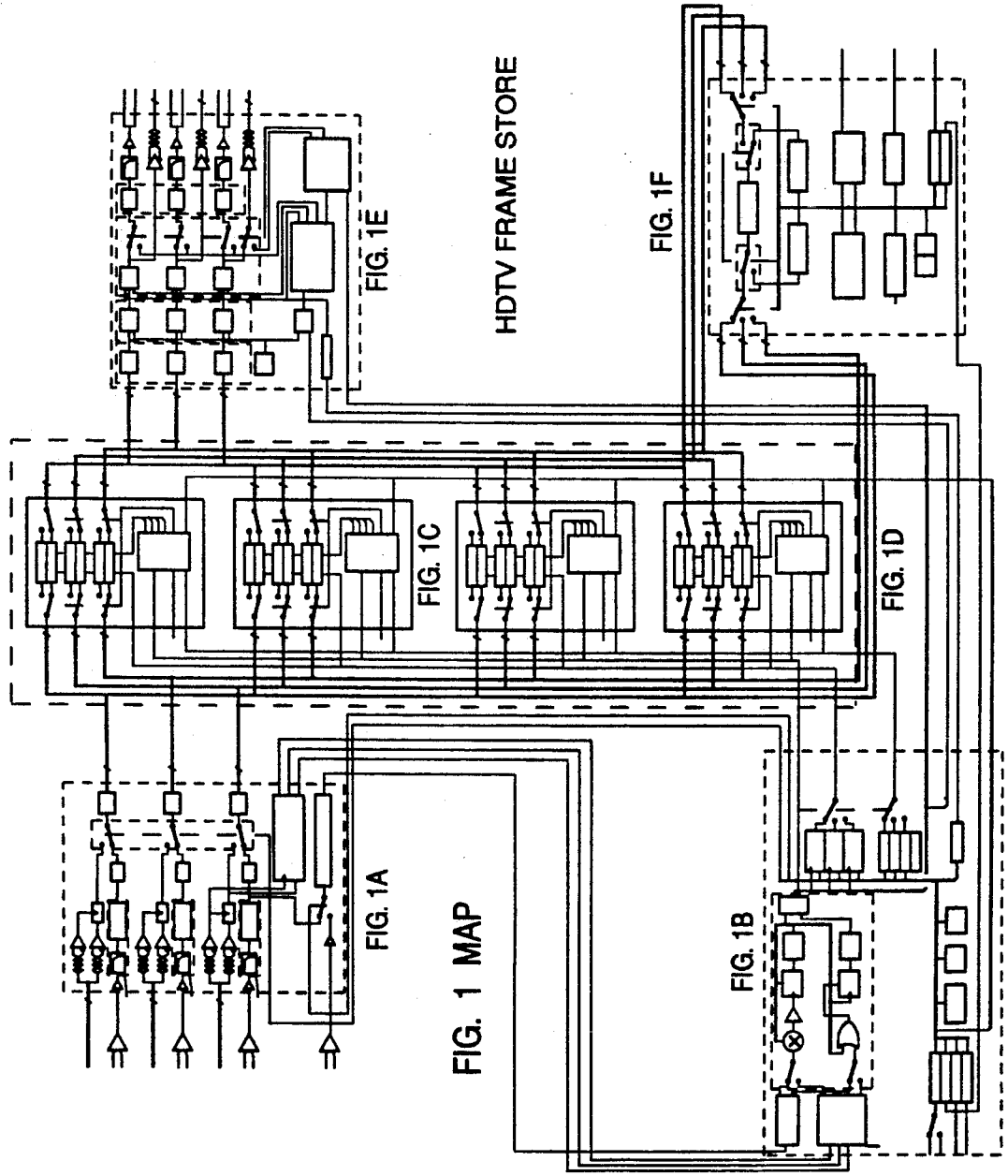

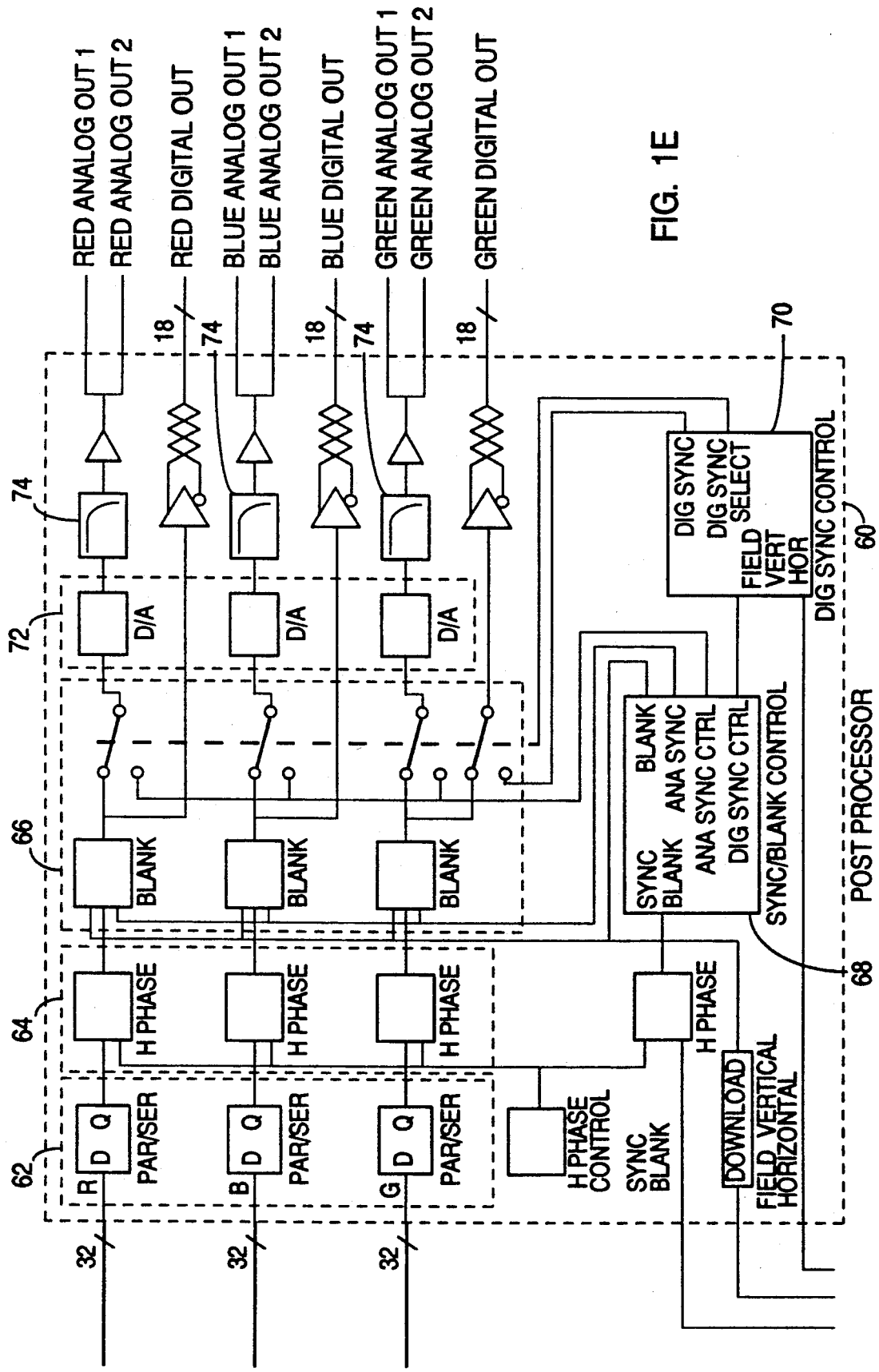

HIGH DEFINITION VIDEO FRAME RECORDER

This is a continuation of co-pending application Ser. No. 07/424,478 filed on Oct. 20, 1989, now abandoned.

FIELD OF THE INVENTION

The invention is a video frame recording system, including means for digitally recording multiple fields or frames of a color, high definition (either digital or analog) video signal. In a preferred embodiment, the invention is a video frame recording system for digitally recording multiple frames of a color, high definition video signal, and transferring individual frames to and from a host computer or image processor.

BACKGROUND OF THE INVENTION

Systems have been proposed for recording individual fields and frames of conventional video signals (having NTSC or PAL format). Recently, the Society of Motion Picture Engineers has adopted a standard, known as the SMPTE 240M standard, for high definition video signals. Throughout this Specification, including in the claims, the phrase "high definition video" signal (or "HDTV" signal) will be used to denote 1125-line, 60 Hz video signals (having an aspect ratio of 16 to 9) which meet the SMPTE 240M standard, or which meet the SMPTE 240M requirements for field rate, aspect ratio, blanking interval duration, and number of horizontal lines per field, but which differ from the SMPTE 240M standard in other respects.

It would be desirable to record one or more individual fields and frames of a color HDTV signal (either analog or digital), for post production, editing, off-speed transfer of the signal, and other purposes. However, until the present invention, it had not been known how to record individual fields or frames of a color HDTV signal for partial or full frame or field transfers to a host computer (or other processing or display unit) at arbitrary speed (i.e., less than or equal to the standard video rate) using a system which emulates a conventional video tape recorder ("VTR") with very fast response and is compatible with conventional digital computer systems and image processing systems.

SUMMARY OF THE INVENTION

The invention is a system for recording one or more individual fields or frames of a color, high definition video signal for subsequent transfer to a processing or display unit. In a preferred embodiment, the system is capable of digitally recording as many as 32 frames of a color, high definition video signal per memory board (as many as four memory boards may be installed in the system). The invention is capable of performing partial or full frame or field transfers at any selected rate less than or equal to the standard video rate. The system of the invention accepts HDTV signals (including Green, Blue, and Red component signals of a color HDTV signal) in either digital or analog format, includes a post processing unit for simultaneously outputting HDTV signals in both digital and analog format, and emulates a conventional video tape recorder in the sense that it responds to conventional video tape recorder control signals.

The system of the invention includes a control unit (for controlling the system's frame memory circuits) and a parallel computer interface. The interface permits full or partial fields or frames to be transferred (in non-real time) between the frame memory circuits and a host computer via a conventional communication link such as an SCSI, DRII or DRVII (trademarks of Digital Equipment Corporation), or other conventional link. The control unit and the computer interface are directly interconnected, so that a host computer may control memory access through the interface. The control unit also accepts commands from a conventional video tape recorder remote control panel.

The invention's design permits record and playback sequences to be freely configured. Frame or field playback of selected duration can be intermixed, with any selected time interval between actions, and any stored field or frame can follow any other upon playback. Accordingly, continuous motion can be simulated by using all or part of the available frames in a repeating sequence.

In a preferred embodiment, the invention is an G,B,R equal bandwidth system employing a sampling rate of 74.25 MHz. Also in a preferred embodiment the memory capacity of the system is modular, and may readily be expanded (for example, from 8 frames to 32 frames) by installation of additional random access semiconductor memory integrated circuits.

BRIEF DESCRIPTION OF THE DRAWINGS

FIG. 1 includes FIGS. 1A through 1F (each of which shows a portion of the FIG. 1 system), and a map (identified as "FIG. 1 Map") showing the relationship among FIGS. 1A through 1F.

DETAILED DESCRIPTION OF THE PREFERRED EMBODIMENT

Figure 1A:
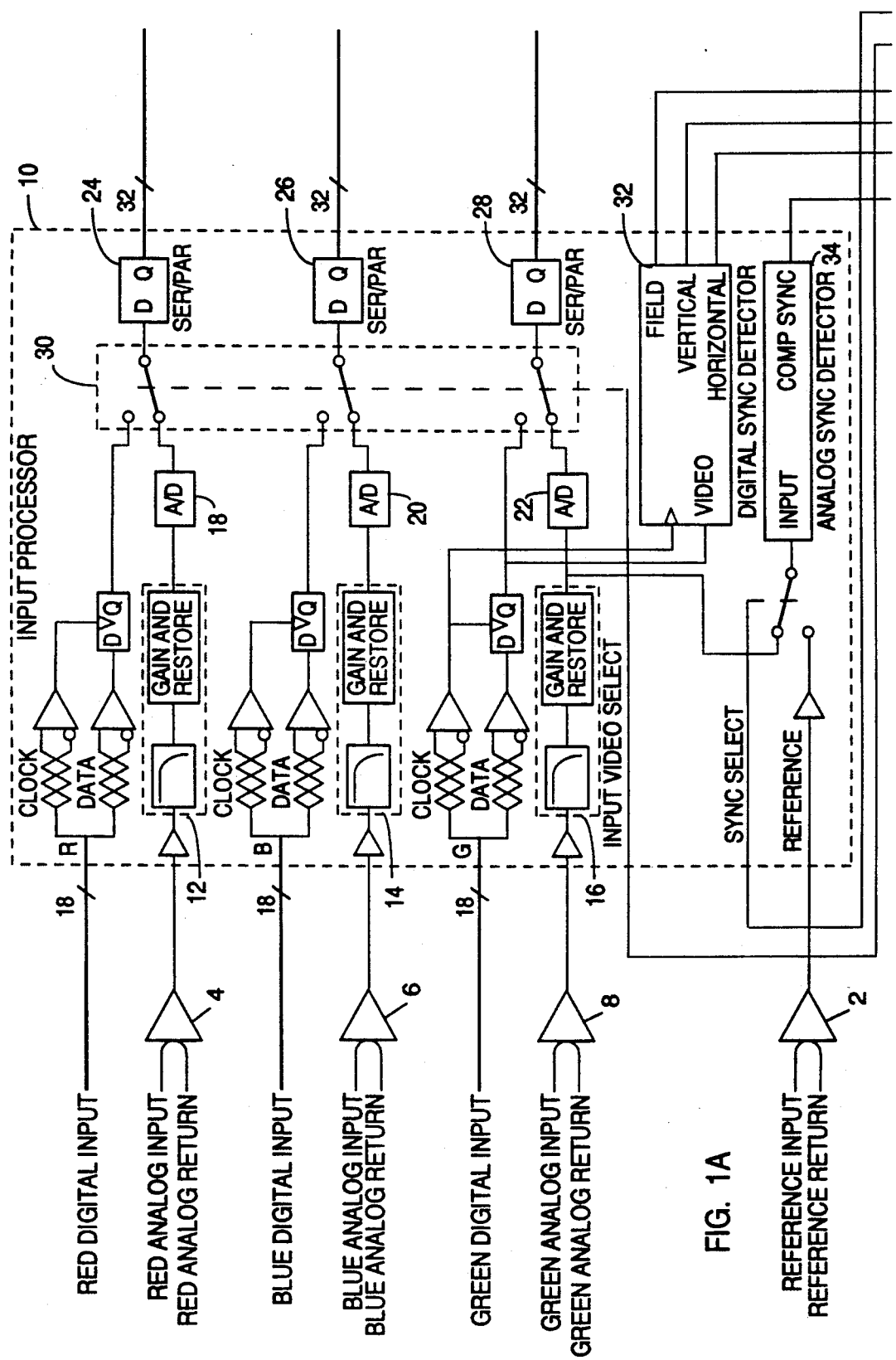
FIG. 1 is a block diagram of a preferred embodiment of the invention.
Figure 1B:
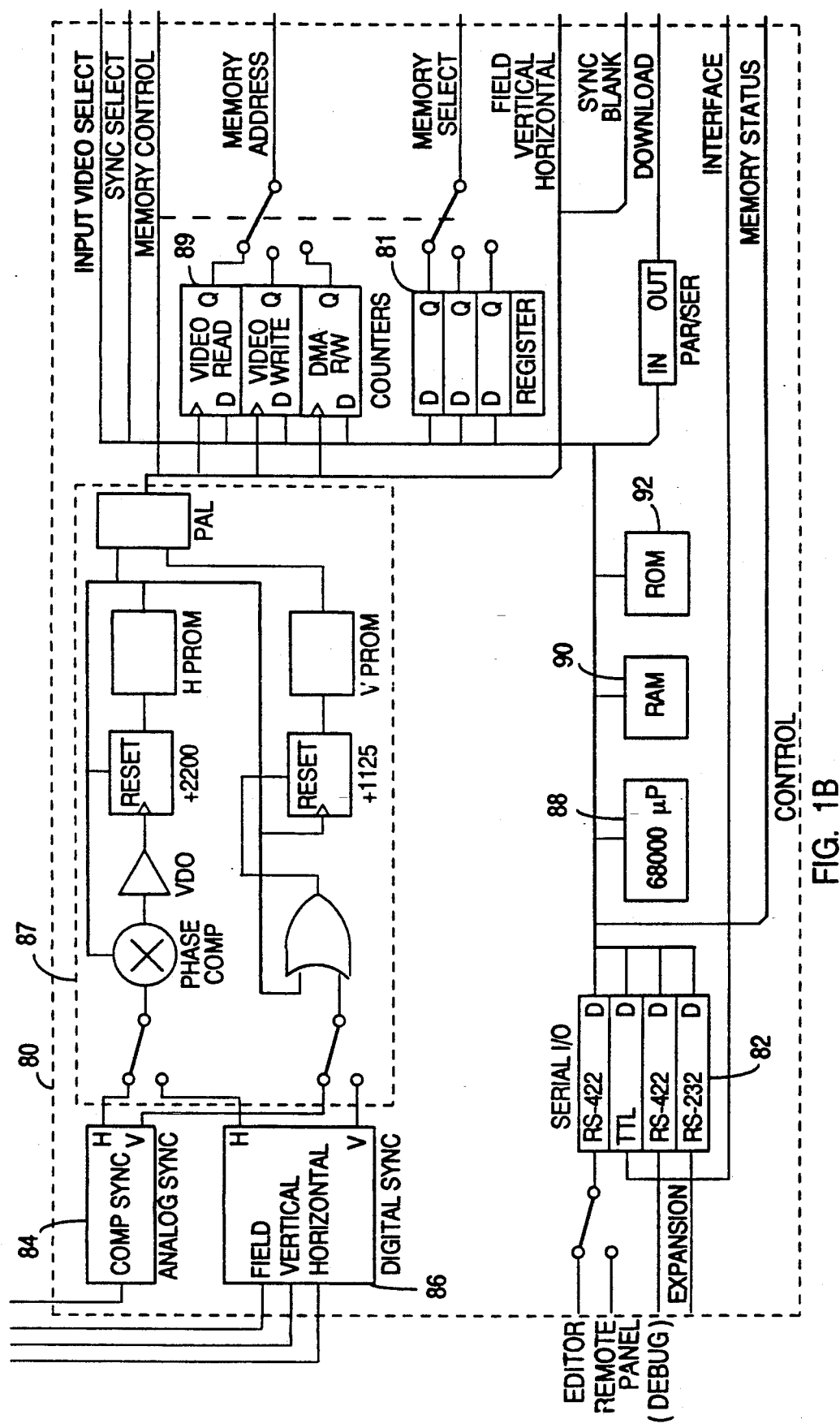
Figure 1C:
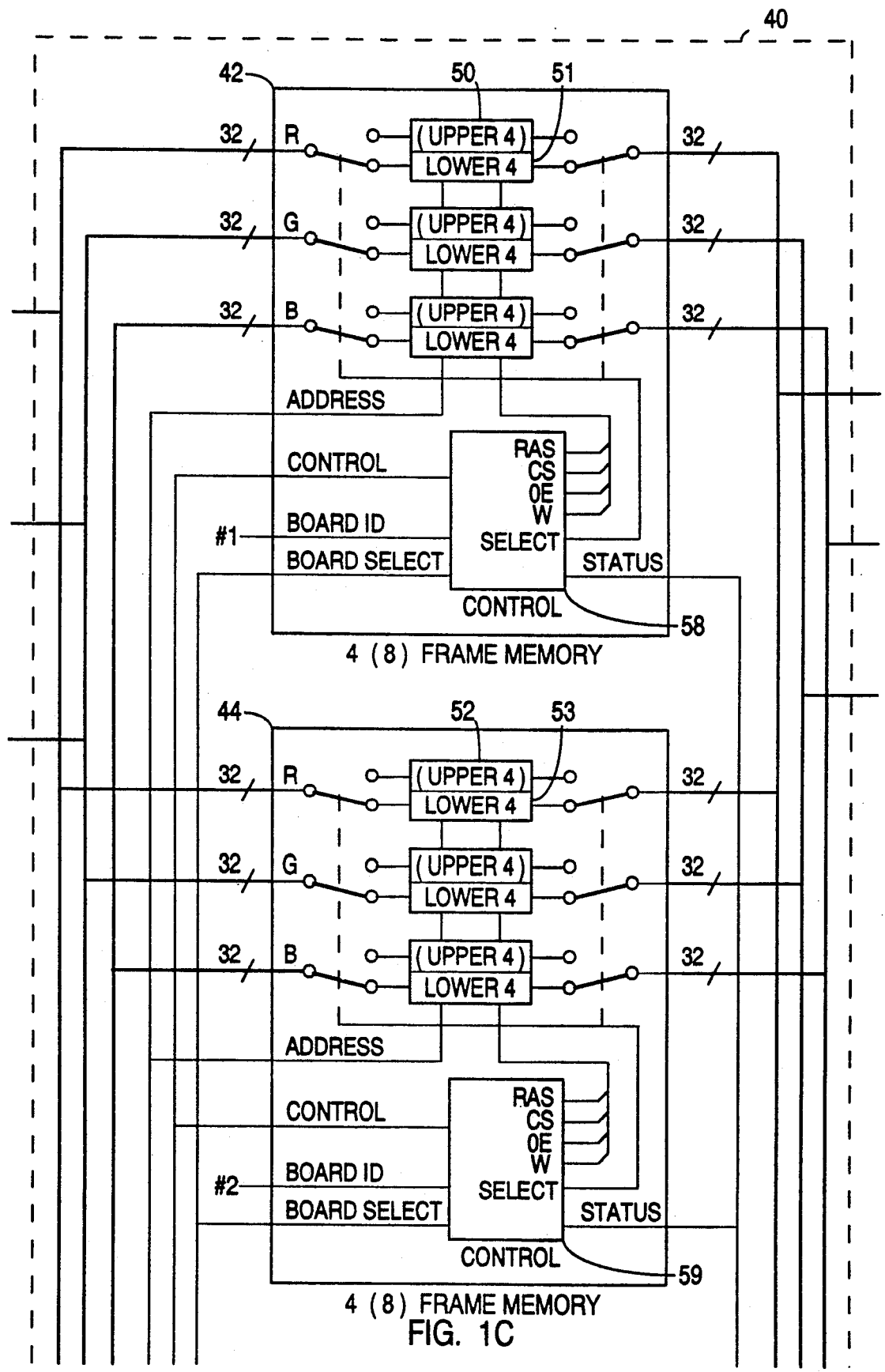
Figure 1D:
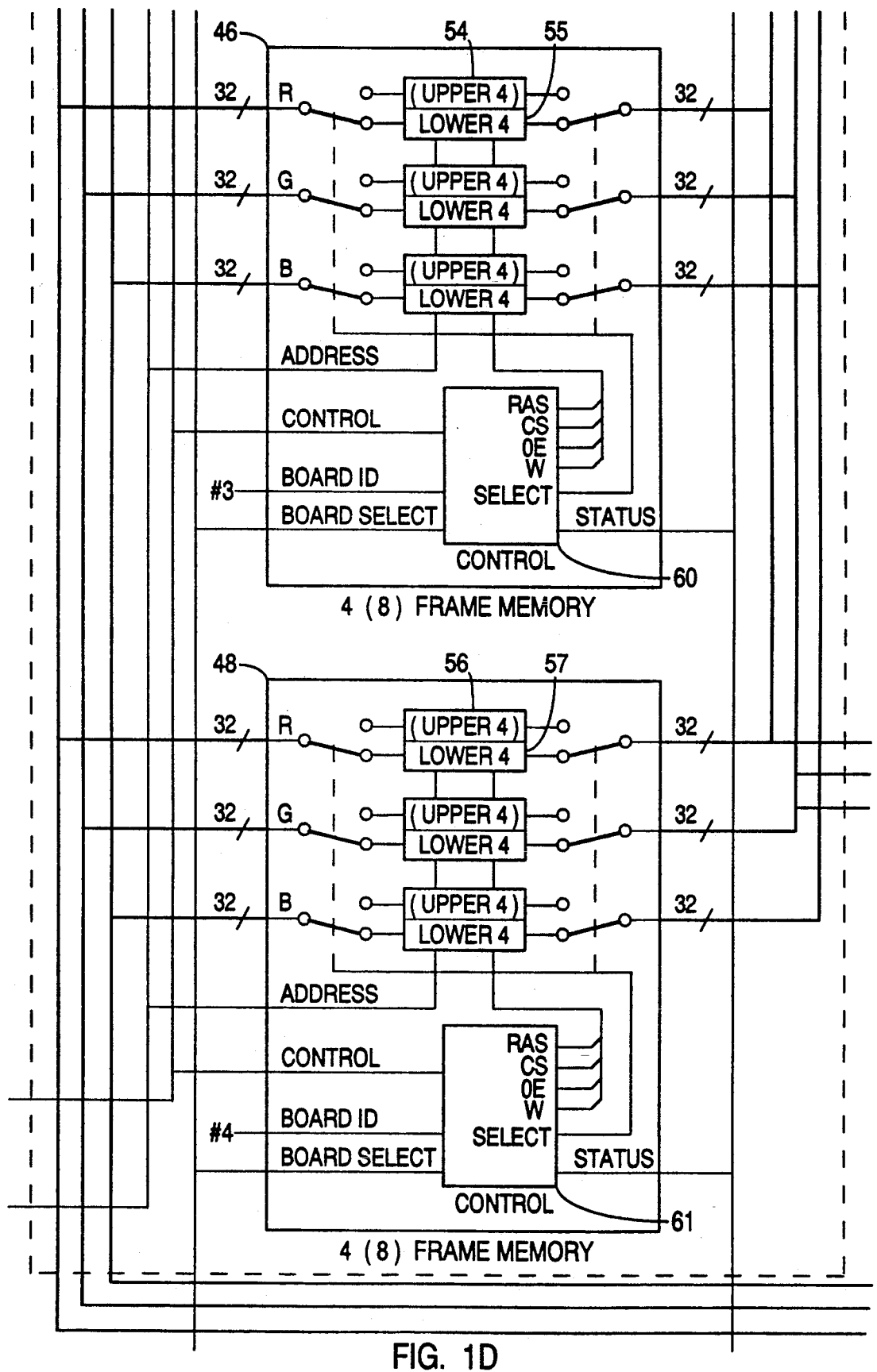
Figure 1F:
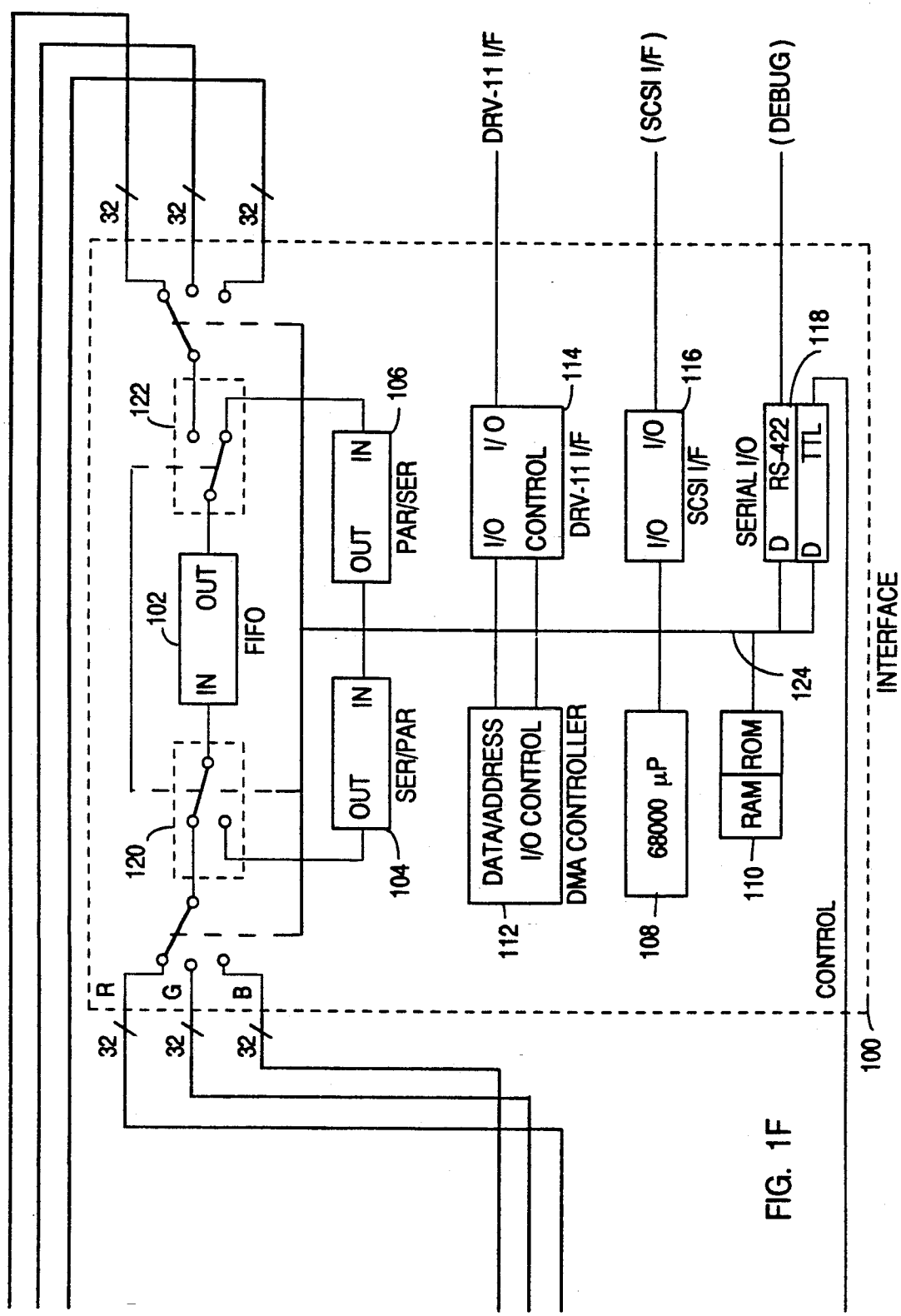

In the FIG. 1 embodiment, the invention includes input processor 10, frame memory unit 40, post processor 60, control unit 80, and computer interface unit 100.

Input processor 10 accepts, processes, and outputs either a set of Red, Green, and Blue digital HDTV signals, or a set of Red, Green, and Blue analog HDTV signals, depending on the state of switch unit 30. Switch unit 30 is controlled by the Input Video Select signal from control unit 80. When switch 30 is in the "digital input signal" mode or state, the parallel bits (typically 18 parallel bits) which comprise each of the Red, Blue, and Green digital HDTV signals are routed to serial-to-parallel converters 24, 26, and 28, respectively. When switch 30 is in the "analog input signal" state, the Red, Blue, and Green analog HDTV signals are digitized in A-to-D converters 18, 20, and 22, respectively, and then routed to serial-to-parallel converters 24, 26, and 28, respectively. In a preferred embodiment, converters 18, 20, and 20 are eight-bit converters having a sampling rate of 74.25 MHz, and each of serial-to-parallel converters 24, 26, and 28 generates a 32-bit parallel output signal at a more manageable rate of 18.5625 MHz.

If switch unit 30 has been set to the "analog input signal" position, the Red, Blue, and Green analog HDTV signals are supplied to filter and gain control units 12, 14, and 16, respectively, before they are digitized in converters 18, 20, and 22. Each of units 12, 14, and 16 preferably includes a low-pass filter designed to maintain a flat bandwidth from 0 to 30 MHz, uniform group delay, and maximum out-of-band attenuation.

Each of units 12, 14, and 16 preferably also includes a means for gain normalizing and black referencing the filtered input signals.

Input processor 10 accepts an external reference input signal (as do conventional video tape recorders), and includes digital sync detector 32 for extracting sync information from one of the Red, Green, or Blue digital HDTV input signals (the Green digital HDTV input signal, in the configuration shown in FIG. 1). Input processor 10 also includes analog sync detector 34 for extracting sync information from either the external reference signal or one of the Red, Green, or Blue analog HDTV input signals (the Green analog HDTV input signal, in the configuration shown in FIG. 1), in response to a Sync Select signal from control unit 80.

Circuits 2, 4, 6, and 8, are provided for returning at least a portion of the Reference, Red, Blue, and Green analog HDTV input signals, respectively, so that the returned signals may be processed or displayed in other means (not shown in the Figures). Preferably, circuits 2, 4, 6, and 8 are operable in a first mode in which they do return, and a second mode in which they do not return, at least a portion of their input signals.

Frame memory unit 40 includes four identical memory boards 42, 44, 46, and 48. Each memory board stores either four or eight frames of Red, Green, and Blue images, depending on the number of integrated memory circuits installed thereon and enabled. In variations on the FIG. 1 embodiment, either one or two memory boards may be deleted from frame memory unit 40. Each frame of each of the Green, Blue, and Red component signals is allocated 2 Mbytes of memory. The active video portion of each frame requires somewhat less than 2 Mbytes, with the remainder of the memory allocated for each frame used for test signal generation or other purposes.

Preferably, standard 256K by 4-bit dynamic memory ICs (integrated circuits) are used in each of memory boards 42, 44, 46, and 48, in order to minimize power consumption, reduce cost, and ensure availability. Standard memory ICs require a wide word width to support the high data rate of high definition video signals. The word width in frame memory unit 40 is preferably 32 pixels, which results in an easily managed memory cycle period of approximately 430 ns.

The memory circuits within each of memory boards 42, 44, 46, and 48 are grouped into two sets. The memory circuits for processing "Red" input signals include a first (or "upper") set 50 of memory ICs and a second (or "lower") set 51 of memory ICs (within board 42), a first (or "upper") set 52 of memory ICs and a second (or "lower") set 53 of memory ICs (within board 44), a first (or "upper") set 54 of memory ICs and a second (or "lower") set 55 of memory ICs (within board 46), and a first (or "upper") set 56 of memory ICs and a second (or "lower") set 57 of memory ICs (within board 48). Similarly, each of boards 42, 44, 46, and 48 includes upper and lower sets of memory ICs for processing "Green" and "Blue" input signals.

Figure 2:
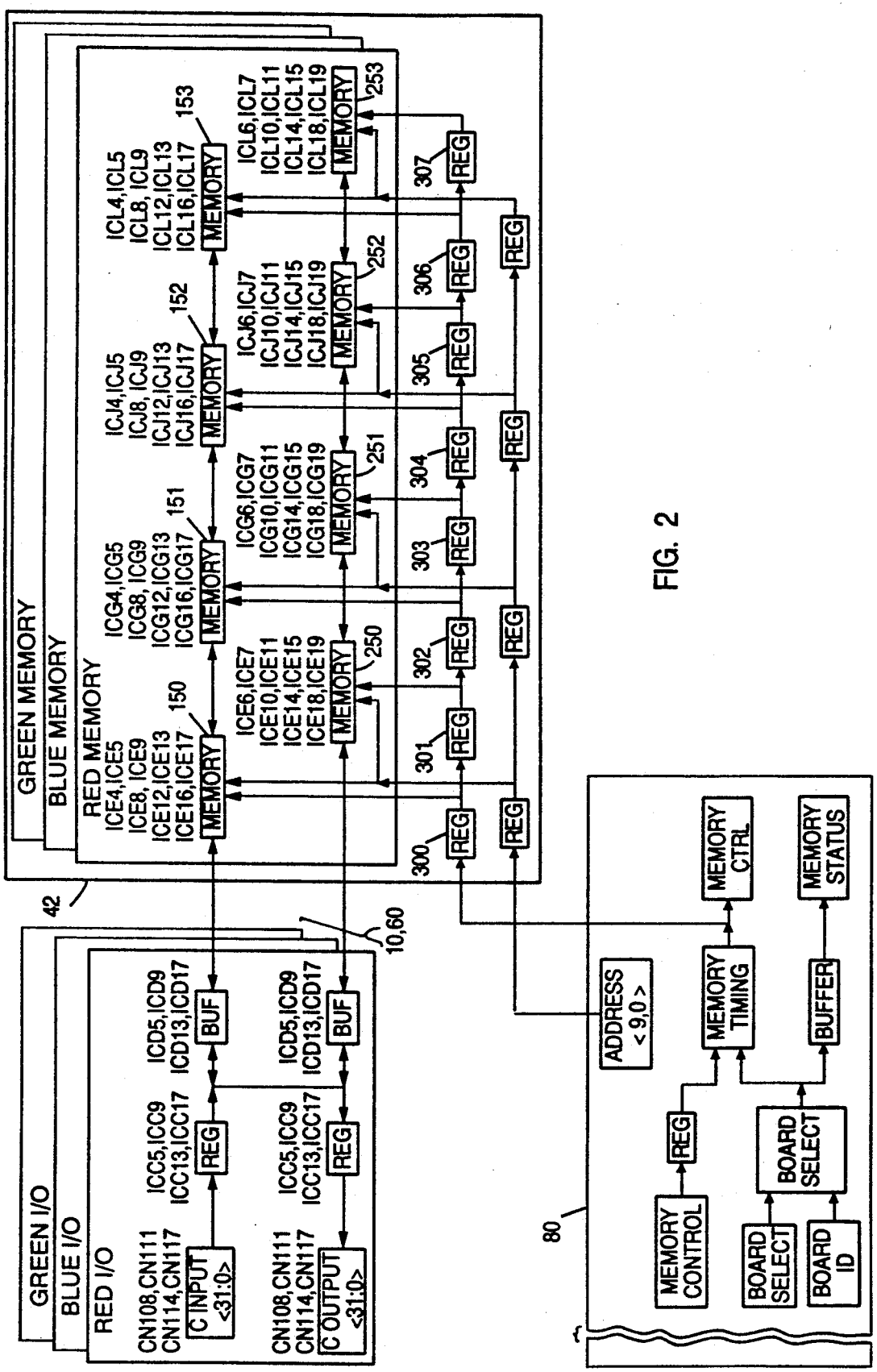
FIG. 2 is a block diagram of a portion of the FIG. 1 system, showing a preferred embodiment of one of the four memory boards within frame memory unit 40 of FIG. 1.

With reference to FIG. 2, frame memory unit 40 includes means for separately disabling (or enabling) the upper or lower sets of memory ICs in response to control signals from control unit 80. FIG. 2 schematically shows a preferred embodiment of memory board 42 of frame memory unit 40. The "Red" component signal processing circuitry within board 42 includes groups 150, 151, 152, and 153 of memory circuits (which together comprise upper set 50 of memory ICs) and groups 250, 251, 252, and 253 of memory circuits (which together comprise lower set 51 of memory ICs). Control unit 80 includes means for sending control signals to memory board 42 to enable groups 150, 151, 152, and 153, or groups 250, 251, 252, and 253, or all of these groups. The system is thus capable of operating in a mode in which either or both of the upper and lower sets of memory ICs are enabled.

In the preferred embodiment, each pixel corresponds to eight bits, so that each 32-bit cluster of parallel bits from input processor represents a cluster of four pixels. To avoid the use of numerous serial to parallel converters (and parallel to serial converters) in frame memory unit 40, we prefer to employ an 8-to-1 interleaving technique to write data from input processor 10 onto the memory boards of frame memory 40 (and the reverse process to read data from the memory boards for transfer to post processor 60). In accordance with this interleaving technique, consecutive clusters of four pixels to be written into memory are accepted consecutively by different memory ICs (or groups of memory ICs). To accomplish this, memory control signals supplied from control unit 80 to frame memory unit 40 are staggered (i.e., time-division multiplexed) so that only one eighth of the memory ICs interacts with each cluster of four pixels (for each of the Red, Blue, and Green video signals). The time-division-multiplexed signals may be generated by dividing a primary control signal into portions, and passing each portion through a different time delay element to produce the time-division-multiplexed control signals at the outputs of the time delay elements.

For example, group 150 of memory ICs (shown in FIG. 2), in response to a first control signal (memory select signal) supplied through shift register 300 from control unit 80 will store 32-bit parallel data representing a first cluster of four pixels) from the Red input signal. Group 250 of memory ICs, in response to another control signal supplied through (and delayed by) both shift registers 300 and 301 will store 32-bit parallel data representing a second cluster of four pixels) from the Red input signal. Similarly, group 151 of memory ICs, in response to another control signal supplied through (and delayed by) shift registers 300, 301, and 302 will store 32-bit parallel data representing a third cluster of four pixels from the Red input signal, group 251 of memory ICs, in response to another control signal supplied through (and delayed by) shift registers 300, 301, 302, and 303 will store 32-bit parallel data representing a fourth cluster of four pixels from the Red input signal, group 152 of memory ICs, in response to another control signal supplied through shift registers 300, 301, 302, 303, and 304 will store 32-bit parallel data representing a fifth cluster of four pixels from the Red input signal, group 252 of memory ICs, in response to another control signal supplied through shift registers 300, 301, 302, 303, 304, and 305 will store 32-bit parallel data representing a sixth cluster of four pixels from the Red input signal, group 153 of memory ICs, in response to another control signal supplied through shift registers 300, 301, 302, 303, 304, 305, and 306 will store 32-bit parallel data representing a seventh cluster of four pixels from the Red input signal, and group 253 of memory ICs, in response to another control signal supplied through shift registers 300, 301, 302, 303, 304, 305, 306, and 307 will store 32-bit parallel data representing an eighth cluster of four pixels from the Red input signal.

The primary memory timing and address generation is performed in control unit 80, to reduce circuit redundancy. Each of the memory boards 42, 44, 46, and 48 receives time-division multiplexed row and column addresses and memory cycle control signals. The addresses are passed directly to the array of memory ICs within each board, and the cycle control signals are converted by programmable logic arrays 58, 59, 60, and 61 (in boards 42, 44, 46, and 48, respectively) to dynamic memory and bus control signals. A series of registers 81 (shown in FIG. 1) in control unit 80 is employed to generate the staggered board selection signals supplied to logic arrays 58, 59, 60, and 61 within boards 42, 44, 46, and 48 during the described interleaving operation.

In an embodiment in which each set of memory ICs 50 through 57 includes 256K by 4-bit dynamic memory ICs, the system has the capacity to store 32 frames of each of the Red, Green, and Blue HDTV component signals (eight frames per board). In a preferred embodiment in which each set of memory ICs 50 through 57 includes 1 Mbyte by 4-bit memory ICs, the system has the capacity to store up to 128 HDTV frames (ie.e, 32 frames per board).

Post processor 60 accepts parallel 32-bit R, G, and B video signals as they are read out from memory unit 40, and converts each of the R, G, and B video signals back into parallel 8-bit format in parallel-to-serial conversion unit 62. Digital signals output from conversion unit 62 have a data rate of 74.25 MHz, in the case that the digital input thereto (digital signals from memory 40) has a data rate of 18.5625 MHz.

Next, digitally implemented delay circuitry 64 delays the R, G, and B signals input thereto, to provide horizontal delay (adjustable within a range of from −400 ns to +400 ns) with a clock period (or 13.468 ns) of resolution. The output of delay circuitry 64 is supplied to blanking and sync insertion circuitry 66. Circuitry 66 operates under control of blanking and analog sync control unit 68, and digital sync control unit 70.

Both digital and analog video signals may be simultaneously output from post processor 60. To generate digital video output signals, control unit 70 will insert digital sync information into the blanking intervals as the video signals are processed in circuit 66, and the signals emerging from circuit 66 are converted to a balanced configuration and sent to digital video outputs. To generate analog video output signals, control unit 68 will insert analog sync information into the blanking intervals as the video signals are processed in circuit 66, and the signals emerging from circuit 66 are then converted to analog form in D-to-A converters 72, filtered in analog output signal filters 74, and sent to analog output line drive amplifiers.

Computer interface unit 100 implements direct memory access by an external processing system (such as a general purpose digital computer or an image processing system) to frame memory unit 40, so that full or partial fields and frames may be transferred at arbitrary speed to and from memory unit 40. Interface unit 100 preferably includes I/O port 106 for communicating with external processors having DR11 or DRV11 interfaces (DR11 and DRV11 are trademarks of Digital Equipment Corporation), SCSI port 116 for communicating with external processors having SCSI interfaces, and serial I/O means 118 for communicating with control unit 80. Preferably, interface 100 employs a command protocol supporting partial or full-frame transfers between port 114 or 116 and an external computer (or image processing system) as well as various control functions. Preferably port 114 transfers data at maximum rate of at least 500 kilobytes per second, and port 116 transfers data at maximum rate of at least 2 Mbyte per second. Preferably, interface 100 includes logic and resident intelligence (shared with control unit 80) to provide video test signals and system debug capability.

All data transfers between interface 100 and frame memory 40 (or input processor 10) flow through first-in-first-out ("FIFO") unit 102, which allows the relatively fast video backplane to communicate with the slower CPU bus 124 within interface 100. FIFO unit 102 accepts a 32-bit parallel high definition video signal from input processor 10 (or frame memory 40), or a 32-bit parallel high definition video signal output from serial-to-parallel converter 104, depending on the status of switch 120 at the input of FIFO unit 102. The 32-bit parallel high definition video signal emerging from FIFO 102 is supplied either to post processor 60 and frame memory 40, or through parallel-to-serial converter 106 to CPU bus 124 within interface unit 100 (on which bus it may propagate to port 114 or 116), depending on the status of switch 122 at the output of FIFO unit 102. Data transfers from interface unit 100 to frame memory 40 are permitted only during horizontal blanking intervals, and FIFO unit 102 allows DMA control circuitry 112 and the other circuitry within interface 100 to continue a direct memory access (DMA) operation during the active video period. In one preferred embodiment, CPU 108 connected to CPU bus 124 is a conventional "68000" microprocessor, and interface 100 includes memory 110 (including both RAM and ROM memory).

In order to reduce the amount of circuitry within interface 100 (such as where packaging constraints apply), control unit 80 may include all circuitry for handling addressing (i.e., for specifying which frame, line, and pixels are involved in a transfer) while circuitry within interface 100 handles the data to be transferred. Internal data transfers (i.e., memory diagnostics and test signal generation) are preferably initiated by control unit 80, in which case unit 80 sends appropriate high level commands to interface 100. External data transfers may be initiated by a host computer or image processing system communicating with port 114 or 116. When a command is acknowledged by the host computer (or image processing system) interface 100 prepares for the data transfer and sends the relevant addressing information to control unit 80. When both interface 100 and control unit 80 are ready, the external data transfer commences.

Control unit 80 generates the required timing, synchronization, and control signals for memory management, video processing, and machine control functions. Control unit 80 includes serial I/O unit 82 having at least one port (such as an RS-422 port) for interfacing to a 9-pin serial control device such as a video editing system, a TTL port for interfacing with interface unit 100, and an RS-232 port for diagnostic and service testing. In the FIG. 1 embodiment, control unit 80 also includes CPU 82, analog sync circuit 84 and digital sync circuit 86 (for receiving sync information from sync detectors 34 and 32, respectively), master clock generator 87 (which receives the output of circuits 84 and 86), registers 81 for supplying board selection signals (described above) to boards 42 through 48 within frame memory 40, address signal circuitry 89 for supplying address signals to frame memory 40, RAM 90, and ROM 92. In one preferred embodiment, CPU 88 within control unit 80 is a conventional "68000" microprocessor.

Master clock generator 87 is phase locked to a selected one of the analog input video, digital input video, or reference signal supplied to input processor 10, and is the primary source for all system timing, addressing, synchronizing, and control.

A TTL interface within serial I/O unit 82 (of control unit 80) and a TTL interface within serial I/O means 118 (of interface unit 100) provide a bi-directional serial communications link between control unit 80 and interface unit 100. Preferably, this link is an eight-bit serial data bus for carrying messages of length variable between 4 bytes and 13 bytes at 38.4K baud. Such message packets will typically include data such as frame or field number, read or write cycle, color component signal to be acted upon, starting line and column designation, number of lines and columns to be transferred, and an indication as to whether a field or frame is to be transferred.

CPU 88 of control unit 80 is preferably programmed to check the validity of the data it receives by checking boundary conditions such as maximum values of 520 lines per field and 1920 columns per line, and to emulate a conventional VTR device by accepting and generating control signals corresponding to VTR control signals. Control unit 80 is preferably also capable of generating local control and status display signals for stand alone use, controlling screen display on the service port, controlling loading of test signal patterns from interface unit 100, generating sync and processing values commensurate with the SMPTE 240M standard, controlling memory addressing and allocation, and providing system sync locking signals.

Various applications of the system of the invention include post production, editing, colorimetry or luminance value changes, animation, and other image processing operations. Partial (or full) fields or frames may be sent from non-real time parallel computer interface 114 or 116 of the invention to a remotely located image processor, and the altered video may then be returned to the system of the invention for evaluation, storage, and/or post processing and output. Thus the invention enables computer graphics to be mixed with or overlaid onto HDTV signals. The system of the invention may be used as a buffer to a high definition digital video tape recorder for achieving computer graphics or for building animation or simulation sequences.

For example, the invention may be employed to transfer stored high quality HDTV images to a print processing system for image modification, and then transferred back into the system of the invention for subsequent transmission to magnetic tape or to a printing press.

Preferably, CPU 88 in control unit 80 is programmed to be capable of reading out data representing a repeating sequence of HDTV fields or frames from the system's frame memory. When reading out data representing a single field of an HDTV video signal, post processor 60 is controlled so as to output a frame signal including information representing only this single field. As is well known, such an output frame signal may be easily generated, although it will exhibit only half the resolution of a normal full frame (two field) HDTV video signal.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A high definition video signal recording system, including:
   a frame memory unit for receiving parallel format data representing a high definition video signal, wherein the frame memory unit includes memory circuitry capable of storing data representing one or more frames of the high definition video signal;
   an interface unit including a parallel interface means for communicating with an external processing system;
   a parallel communications link for transferring parallel format high definition video data between the interface unit and the frame memory unit;
   a control unit connected to the frame memory unit and the interface unit, for controlling the transfer of parallel format data representing high definition video signal frame or fields into storage within the frame memory unit, and for controlling the transfer of stored data representing high definition video frames or fields from the memory circuitry within the race memory unit to the parallel communications link; and
   an input processor connected to the frame memory unit and the control unit, and inclining means for converting an input high definition video signal into parallel format data representing said input high definition video signal, and for supplying said parallel format data to the frame memory unit, wherein the input high definition video signal is a digital signal having a data rate substantially equal to 74.25 MHz, and the parallel format data is supplied of the frame memory unit as a digital signal having a data rate substantially less than 74.25 MHz, wherein the frame memory unit includes our memory boards, and wherein each of the memory boards has capacity to store data representing 32 frames of a color high definition video signal.

2. A high definition video signal recording system, including:
   a memory unit including memory circuitry capable of storing data representing one or more fields of a parallel format high definition video signal, wherein said parallel format high definition video signal meets SMPTE 240M requirements for field rate, aspect ratio, blanking interval duration, and a number of horizontal lines per field;
   an interface unit connected of the memory unit and including a parallel interface means for communicating with an external processing system; and
   a control unit connected to the memory unit and connected to the interface unit by a serial communications link, for controlling the transfer of parallel data representing fields of a first high definition video signal between the memory unit and the interface unit, wherein said first high definition video signal meets SMPTE 240M requirements for field rate, aspect ratio, blanking interval duration, and number of horizontal liens per field, and wherein the control unit includes a central processing unit programmed to respond to conventional video tape recorder control signals.

3. The system of claim 2, also including an input processor connected to the control unit and the memory unit, for supplying parallel data representing a second high definition video signal to the memory unit.

4. A high definition video signal recording system, including:
- a memory unit for storing data representing one or more fields of a parallel format high definition video signal;
- an interface unit connected to the memory unit and including a parallel interface means for communicating with an external processing system;
- a control unit connected to the memory unit and connected to the interface unit by a serial communications link, for controlling the transfer of parallel data representing fields of a first high definition video signal between the memory unit and the interface unit; and
- an input processor connected to the control unit and the memory unit, for supplying parallel data representing a second high definition video signal to the memory unit, wherein the input processor includes means or receiving a color high definition video signal having red, green, and blue component signals, and means for filtering each of the component signals of that the each of the filtered component signals has a substantially flat bandwidth from 0 to 30 MHz, means for digitizing each of the filtered component signals with a first data rate, and means for converting each of the digitized component signals into a parallel format component signal having a second data rate lower than the first data rate, and wherein the parallel format component signals together comprise the second high definition video signal.

5. The system of claim 3, wherein the input processor includes means or receiving a color high definition video signal having red, green, and blue component signals, means for returning at least a portion of the red, green, and blue component signals, and means for generating said parallel data from a non-returned portion of the red, green, and blue component signals.

6. The system of claim 2, wherein the memory unit includes a number of memory circuits, wherein the control unit includes means for supplying time-division multiplexed memory control signals to the memory unit, and wherein the memory unit writes consecutive pixel clusters of the second parallel format high definition video signal consecutively into different ones of the memory circuits in response to the time-division multiplexed memory control signals.

7. The system of claim 2, wherein the memory unit is modular, and wherein the capacity of the memory unit is expandable by installation of additional memory boards therein.

8. The system of claim 2, wherein the control unit and the interface unit each includes a serial interface means, so that the control unit and the interface unit are directly connected by a serial communication link, and wherein the control unit includes a central processing unit programmed to permit an external processor to access the frame memory unit through the parallel interface means.

9. The system of claim 8, wherein the control unit includes means for generating and forwarding address and control signals to the memory unit in response to commands received from the external processor through the serial communication link from the parallel interface means of the interface unit, and wherein the interface unit includes means for receiving data representing a color high definition video signal and converting said data into parallel data, and means for transferring the parallel data to the memory unit for recording therein in response to the address and control signals.

10. The system of claim 2, wherein the interface unit includes a first-in-first-out circuit and a CPU bus, wherein the parallel interface means is connected to the CPU bus, and wherein the first-in-first-out circuit is connected between the memory unit and the CPU bus, so that all data transfers between the interface unit and the memory unit flow through the first-in-first-out circuit.

* * * * *